United States Patent [19]

Klemick

[11] 4,223,901
[45] Sep. 23, 1980

[54] HYDRAULIC LIFT TRUCK

[75] Inventor: Richard E. Klemick, Pottsville, Pa.

[73] Assignee: Liftanroll, Inc., Pottsville, Pa.

[21] Appl. No.: 858,750

[22] Filed: Dec. 8, 1977

[51] Int. Cl.$^2$ .............................................. B66F 5/04
[52] U.S. Cl. .................................................. 280/43.12
[58] Field of Search .................... 280/43.12, 93.12; 60/594

[56] References Cited

U.S. PATENT DOCUMENTS

| | | | |
|---|---|---|---|
| 3,701,211 | 10/1972 | Best | 280/43.12 |
| 3,843,147 | 10/1974 | Fredricson | 280/43.12 |
| 3,982,767 | 9/1976 | Larsson et al. | 280/43.12 |

*Primary Examiner*—John J. Love
*Assistant Examiner*—Norman L. Stack
*Attorney, Agent, or Firm*—Weiser, Stapler & Spivak

[57] ABSTRACT

A hydraulic lift truck of relatively light weight construction comprising a minimum number of operating parts is disclosed. A piston pump includes a follower which rides upon a curved cam surface to pressurize a hydraulic system when the handle is arcuately reciprocated. A hydraulic pressure release is activated from the handle to lower the lift ram most conveniently. Bleed holes positioned at the full lift position of the ram delineate the upper limit for travel of the lift ram. An overload hydraulic by-pass is provided to release and dump high pressure fluid directly into the fluid reservoir in the event of overload. The fluid reservoir is integral with the handle and the pump is sealed whereby the handle and pump may be easily separable for ease in shipment and servicing.

49 Claims, 11 Drawing Figures

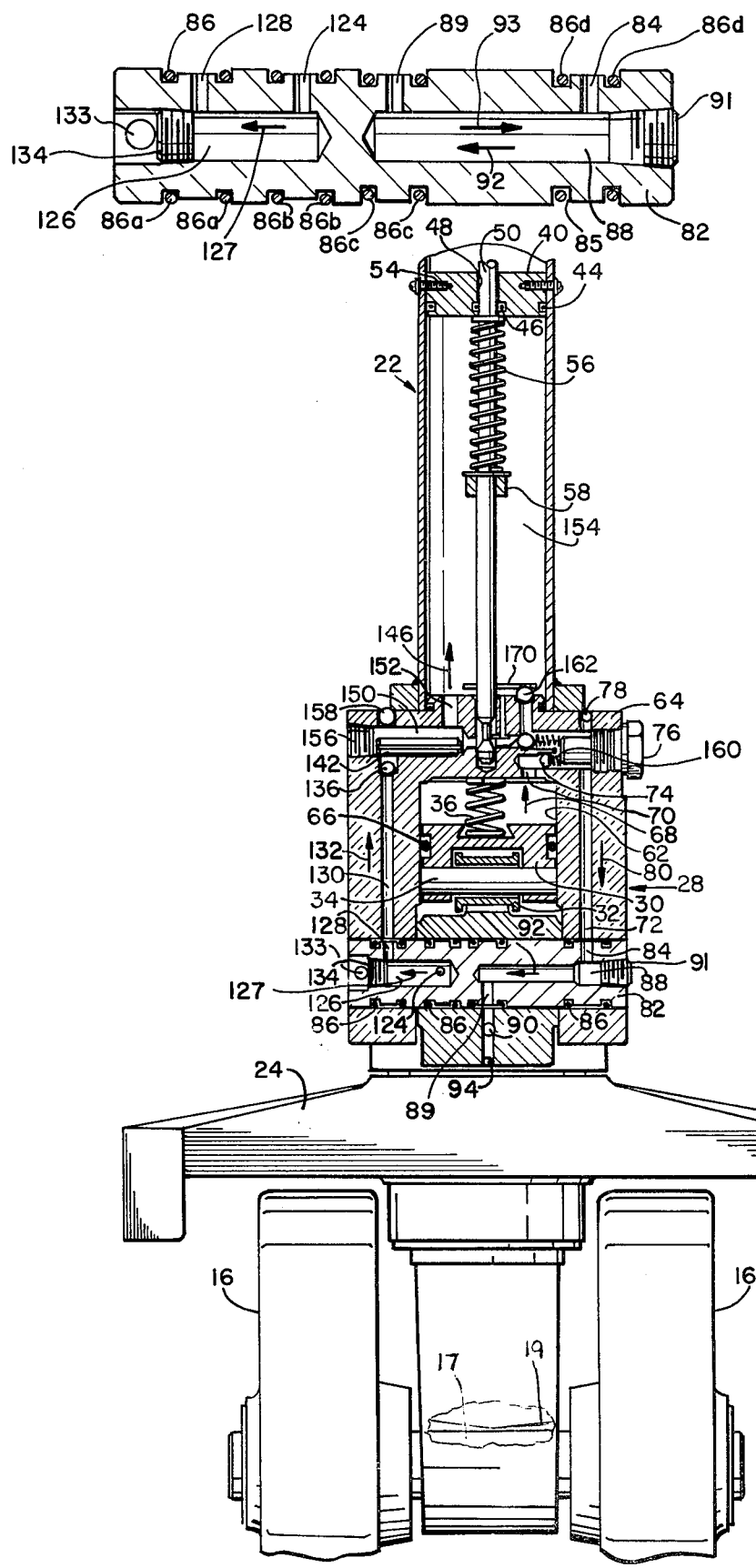

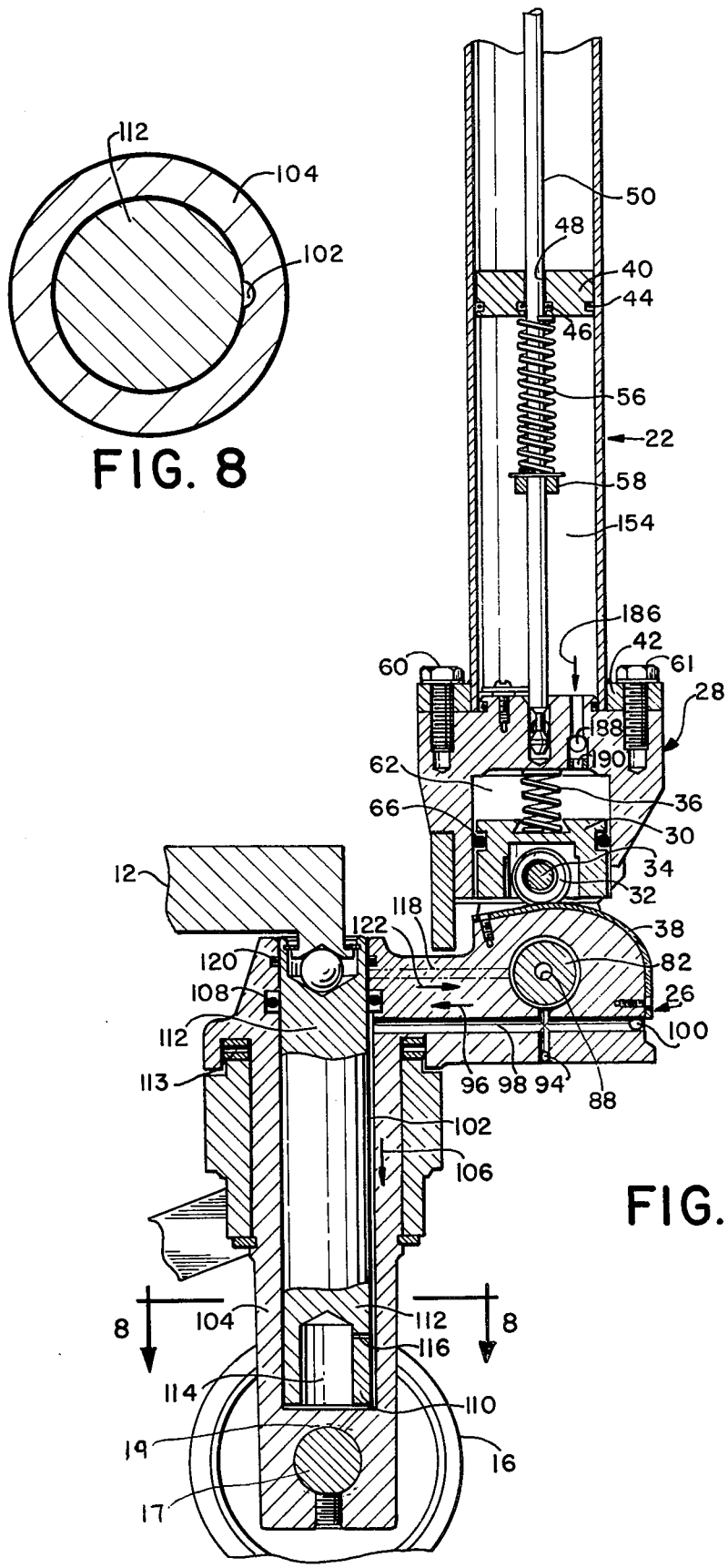

HYDRAULIC LIFT TRUCK

BACKGROUND OF THE DISCLOSURE

The present invention relates generally to the field of hydraulic lift trucks and more particularly, is directed to a hydraulic lift truck particularly suitable for use as a pallet truck.

Pallet trucks or hydraulic lift trucks are well known in the prior art and such devices usually incorporate a steel frame including an extended, elevating platform, a suitable hydraulc system to raise and lower the platform, a handle to direct movement of the device both in the loaded and unloaded conditions and which may include means to activate the hydraulic system. Devices of the general type set forth are disclosed in U.S. Pat. Nos. 3,122,381 and 3,276,787 respectively to Klemick and Budro and in U.S. Pat. No. 3,817,546 to Sugiura. Other pallet trucks of the general type described are manufactured and sold respectively by Stokvis Multiton Corporation, Port Washington, New York under the trademark "Multiton"; Blue Giant Equipment Corporation, Buffalo, New York under the trademark "Blue Giant"; Ramco Standard Corporation, Medina, Ohio, under the trademark "Lo-Jo Elite"; and Equipment Company of America, Hialeah, Florida, under the trademark "Pallift".

All of the prior art hydraulic lift devices of which I am familiar are quite heavy in construction and complicated in design. The existing lift trucks include great numbers of operating parts which result in increased labor costs and parts expenditures during the manufacturing processes and increased maintenance costs after the hydraulic lift trucks have been in use.

SUMMARY OF THE INVENTION

The present invention relates generally to the field of lift trucks, and more particularly, is directed to a hydraulic lift truck incorporating the latest developments in structual materials, light weight component materials, and having a greatly reduced number of operating parts to provide a low cost, light weight, easily maintained industrial lift truck.

It is well known that industrial lift trucks are manually pushed or pulled often when empty than when loaded and accordingly, any reduction in the weight of the unit immediately serves to reduce operator fatigue and to increase productivity. The light weight construction of the present invention is accomplished by a greatly reduced number of operating parts that simplify component design and produces an extremely efficient lift truck capable of longer life with lower maintenance costs.

The hydraulic fluid reservoir is integrally formed within the handle and the pump is sealed to eliminate leakage regardless of the orientation of the pump or truck. In such a construction, the parts are easily separable to thereby present definite advantages when shipping or servicing the lift truck unit.

In the preferred embodiment, the reservoir is located immediately above the hydraulic fluid intake valve, whereby gravity feed will assure full fluid intake on the pump suction stroke to aid the vacuum suction principle of operation on which most hydraulic pallet trucks rely. The location of the reservoir above the intake valve eliminates the need for purging the hydraulic circuit of air prior to each lift, as found necessary in most other prior art devices. By forming the reservoir integral with the pump handle, the need for a separate reservoir chamber is thereby eliminated to thus reduce the bulk and cost of the present device.

The pump assembly of the present invention is entirely separate and independent of the lift cylinder assembly, handle and reservoir whereby the complete pump unit can be easily replaced when necessary without replacing other integral parts. This is another construction and design feature which results in considerably reducing maintenance costs.

A pump piston is provided under the reservoir and the intake valve which is designed for gravity feed and vacuum feed of the hydraulic fluid on the intake stroke. A free floating design of the piston allows centering of the piston in the pumping chamber to assure full ring sealing to provide infinitely long life without undue wear to seals, the piston or the piston chamber. The enclosure of the pump piston within the pump body minimizes chances of external abuse or accidental damage by the operator or by accidental falling of the materials being transported. The body is fabricated of non-corrosive, light weight, low cost, easily serviced and easily replaced material. The piston chamber wall of the pump is constantly lubricated in a manner to minimize wear.

A hydraulic fluid release or lowering valve is provided which is unique in application and functions without requiring any direct interconnecting linkage. The lowering valve comprises a release pin which serves as a follower upon a cam positioned upon the lower end of the release rod. Upon movement of the release rod, the cam urges the release pin against a hydraulic fluid release valve to open the valve and thereby allow the pressurized fluid to flow back to the reservoir.

An internal spring is provided to maintain piston follower contact with the shaped cam face on the lift housing as the handle is arcuately reciprocated to elevate the lift ram. The spring also functions in addition to the hydraulic pressure developed by the frame weight to maintain or hold the pump handle in any position within the ninety degree arcuate operating range. The bias of the spring acts against the top of the piston and serves as a detent to prevent the handle from accidentally falling forwardly to thereby hurt the operator or perhaps to cause hazards for passers-by. The spring allows the operator to remove his hand from the truck handle at any time and then to pick up at the same position of pulling or pushing the truck. Because of this, the prior art type of peddle actuated or lever actuated devices necessary to free the handle can be completely eliminated.

A shaped cam face is provided to form a guided path over which the pump piston follower travels in a manner unique in this field. The cam shaped face or lug can be configured to any suitable profile according to the lift capacity requirements of the truck to thereby provide a substantially infinite range of operation with all other components remaining constant. A hardened suitably configured liner mounted over the exterior periphery of the cam shaped lug provides a wear resistant surface for long life capability.

A vertically grooved lift chamber is provided in the lift ram housing to allow free flow of hydraulic fluid into the lift area in a manner not heretofore employed by prior workers in the field. The pressurized hydraulic fluid flows downwardly through the groove and acts to elevate the lift ram as the pump is reciprocated upon arcuate reciprocation of the handle. A cross drilled, full lift port is provided in the lift arm housing to allow hydraulic fluid to return to the reservoir when the lift piston or ram has been raised to its uppermost position. The full lift port is located between a high pressure seal and an atmospheric seal to develop a unique by-pass arrangement. The bottom of the lift ram is cross drilled to provide a plurality of radial bleed holes which are designed to permit flow of hydraulic fluid therethrough when the lift ram is elevated to the upper extent of its path of travel. The cross drilled bleed holes can be located at any position elevated from the lift ram bottom to provide an infinite range of truck lift heights. When the lift ram is sufficiently elevated to align the bleed holes with the full lift port, hydraulic fluid flows therethrough and further elevation of the lift ram is prevented.

The main frame employs recently developed, high strength, lost cost steel which, when coupled with sound design engineering practices, has helped to reduce the weight of the present lift truck construction by twenty-five to fifty percent of the weight of other presently available lift truck mechanisms.

It is therefore an object of the present invention to provide an improved hydraulic lift truck of the type set forth.

It is another object of the present invention to provide a novel hydraulic lift truck including light weight, low cost design features which currently cannot be achieved by available prior art, lift truck designs.

It is another object of the present invention to provide a novel, hydraulic lift truck featuring simplicity of component design and a greatly reduced number of operating parts to thereby provide longer life and lower maintenance costs.

It is another object of the present invention to provide a novel, hydraulic lift truck wherein the hydraulic reservoir is integral with the handle and whereby the handle and pump are sealed to render the parts readily separable for shipping and servicing.

It is another object of the present invention to provide a novel, hydraulic lift truck construction comprising a roller or follower to activate pump piston travel and a cam shaped lug to provide a desired profile for guiding the action of the piston pump roller.

It is another object of the present invention to provide a novel, hydraulic lift truck wherein a hydraulic fluid release valve is operable from the handle by employing a handle contained release rod to unseat the release valve upon function of a handle positioned operating lever wherein the lowering rate is directly proportional to lever actuation, regardless of handle position through ninety degree arcuate travel or through two hundred and twenty degree steering action.

It is another object of the present invention to provide a novel, hydraulic lift truck wherein a lift ram is elevated by hydraulic fluid within a lift ram housing and wherein the housing is longitudinally grooved to introduce hydraulic fluid under pressure to the bottom of the lift ram.

It is another object of the present invention to provide a novel, hydraulic lift truck wherein a lift ram is elevated within a lift ram housing by hydraulic fluid under pressure and wherein the housing includes a full lift port and the ram is provided with hydraulic fluid bleed holes, the port and the bleed holes cooperating to define the upper limit of travel of the lift ram.

It is another object of the present invention to provide a novel, hydraulic lift pump that is inexpensive in manufacture, relatively simple in design and trouble free when in operation.

Other objects and a fuller understanding of the invention will be had by referring to the following description and drawings wherein like reference character refer to similar parts throughout the several views and in which:

BRIEF DESCRIPTION OF THE DRAWINGS

FIG. 5 is a partial, cross-sectional view taken along line 5—5 of FIG. 3, looking in the direction of the arrows.

FIG. 6 is an enlarged, cross-sectional view of the combination spool valve and pivot shaft construction.

FIG. 7 is a partial, cross-sectional view taken along line 7—7 of FIG. 3, looking in the direction of the arrows.

FIG. 8 is an enlarged, cross-sectional view taken along line 8—8 of FIG. 7, looking in the direction of the arrows.

DESCRIPTION OF THE PREFERRED EMBODIMENTS OF THE INVENTION

Figure 1:
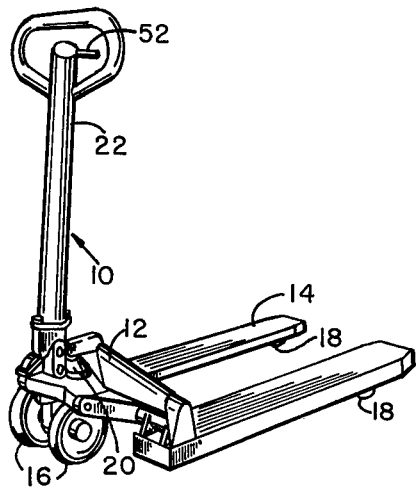
FIG. 1 is an isometric view of the hydraulic lift truck of the present invention showing the lift mechanism in its lowest position.

Although specific terms are used in the following description for the sake of clarity, these terms are intended to refer only to the particular structure of the invention selected for illustration in the drawings and are not intended to define or limit the scope of the invention.

Figure 2:
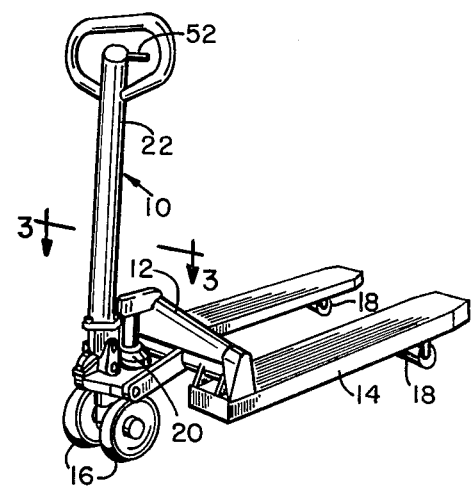
FIG. 2 is a view similar to FIG. 1 showing the lift mechanism raised to an elevated position.

Referring now to the drawings, there is illustrated in FIGS. 1 and 2, a hydraulic lift truck 10 which is constructed in accordance with the teachings of the present invention and which comprises generally a frame 12 which includes a rigidly connected platform or fork 14 for load lifting purposes. The lift truck 10 is conventionally movable over a surface by employing a pair of rotatable steering wheels 16 and conventional fork wheel rollers 18. A hydraulic unit 20 is carried within the frame 12 and is activated by arcuate movement of the handle 22 to elevate the fork or platform 14 in the manner hereinafter more fully set forth for load transportation purposes.

Figure 3:
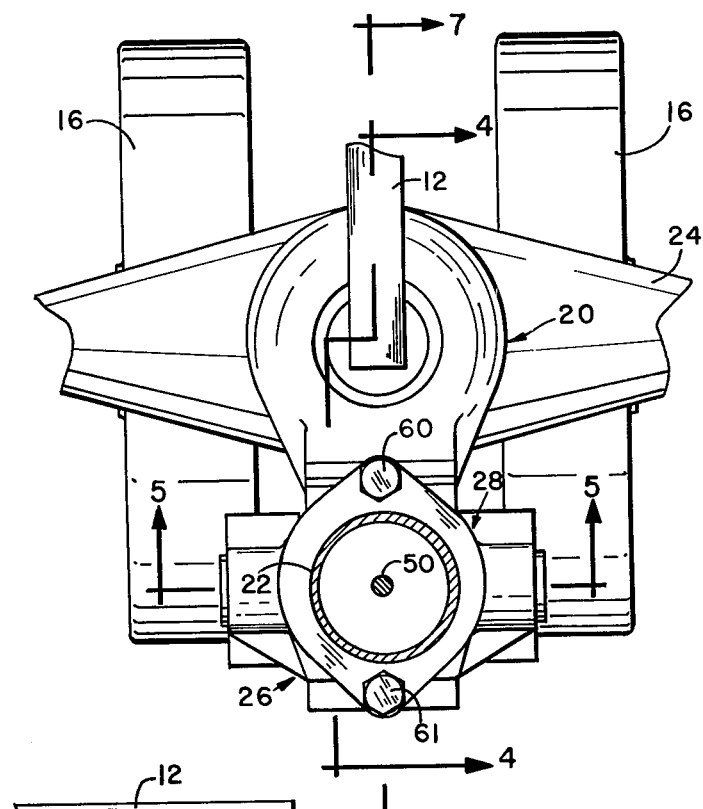
FIG. 3 is an enlarged, partial top plan view showing the pump assembly and lift mechanism, looking from line 3—3 of FIG. 2.

As illustrated in FIG. 3, the handle 22 mounts forwardly of the frame yoke 24 and is connected thereto in a manner to rotate the hydraulic unit about its yoke bearing 113 (FIG. 7) through a wide arc of rotation; for example, approximately through two hundred and twenty degrees to turn the wheels 16 for lift truck steering purposes. The handle 22 is arcuately reciprocal through approximately ninety degrees about the lift ram assembly 26 for elevation of the frame 12 for load lifting and transportation purposes in the manner hereinafter more fully set forth.

Figure 4:
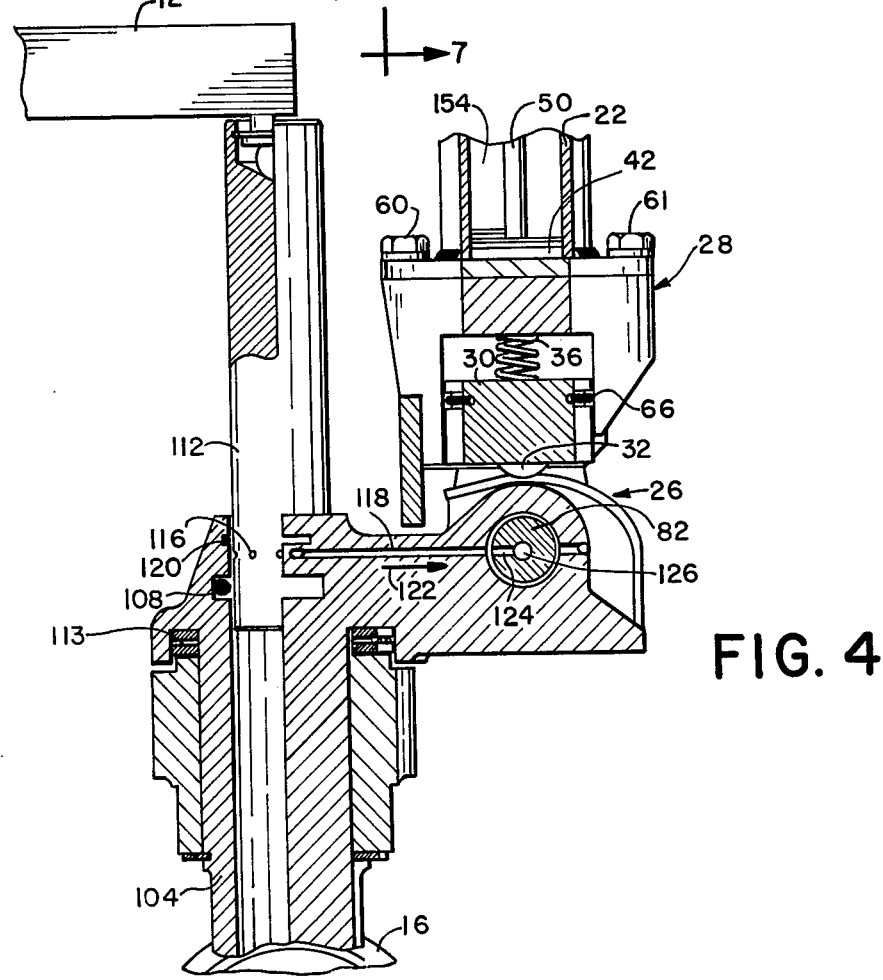
FIG. 4 is a partial, cross-sectional view taken along line 4—4 of FIG. 3, looking in the direction of the arrows.

Referring now to FIGS. 4, 5 and 7, the interaction of the handle 22, the pump 28 and lift ram assembly 26 is illustrated. The pump 28 and lift ram assembly 26 comprise generally the pump housing assembly within which the pump piston 30 is reciprocable to initiate activation of the hydraulic circuit as hereinafter more fully set forth. The pump housing assembly includes a lower positioned roller or follower 32 which is rotatable about the piston pin 34 for pump reciprocation purposes as the follower is urged over the cam face 38. A spring or other resilient means 36 biases against the top of the piston 30 of the pump 28 to continuously urge the piston in a downward direction as viewed in FIGS. 4 and 5. The roller 32 rides over a curved cam surface 38 which preferably includes a hardened steel plate to minimize wear. It will be noted that the cam plate or face 38 is arcuately curved whereby the roller 32 will act to vertically reciprocate the piston 30 within the pump housing when the handle 22 is arcuately reciprocated relative to the frame 12, for example, when reciprocated through approximately ninety degrees or portion thereof.

Still referring to FIGS. 4, 5 and 7, it will be noted that the handle assembly 22 is fabricated to a hollow configuration and incorporates a hydraulic fluid reservoir 154 which is defined between the reservoir cap 40 and the handle base 42. The cap 40 is provided with suitable external seals 44 and internal seals 46 to prevent leakage thereabout. It will be noted that the reservoir cap 40 is provided with a concentric bore 48 through which the release rod 50 is reciprocal for release of the high pressure hydrualic fluid upon function of the operating lever 52 in the manner hereinafter more fully set forth.

As illustrated, the reservoir cap 40 is suitably secured in a desired longitudinal position in the handle 22 by utilizing conventional fasteners 54. A spring 56 biases between the bottom of the reservoir cap 40 and a release rod affixed collar 58 to continuously urge the release rod 50 in the direction of the pump housing assembly 28. The collar 58 may be affixed in any desired longitudinal position by employing a conventional set screw (not shown). The spring 56 acts to spring load the release rod 50 to continuously urge the release rod to an initial, valve closing position as hereinafter more fully explained. The handle assembly 22 is removably secured to the pump housing assembly 28 by the pair of threaded fasteners 60, 61.

Referring now to FIG. 5, it will be seen that the housing assembly 28 comprises generally a body 64 which is drilled or otherwise formed to provide a plurality of hydraulic fluid passages therewithin. A pump chamber 62 is defined within the body 64 within which the piston 30 is vertically reciprocal. A piston seal 66 is formed in the periphery of the piston 30 to suitably seal the pump piston 30 as it reciprocates within the chamber 62 when pumping the hydraulic fluid (not illustrated).

Upon downward arcuate rotation of the handle assembly 22 about the lift ram assembly 26, the roller or follower 32 rolls over the cam plate 38 and the shape of the cam initially forces the pump piston 30 upwardly within the pump chamber 62 as viewed in FIG. 5. Hydraulic fluid within the chamber 62 is forced upwardly in the direction of the arrow 68 through the port 70 past the one-way valve 74 and thence downwardly through the hydraulic fluid channel 72. A steel or suitable material ball 74 is retained in position within the port 70 by the threaded plug 76. A spring 160 biases between the plug 76 and the ball 74 to continuously urge the ball towards its seat to thereby function as a one-way valve. Channel 72 is upwardly closed by the steel ball 78 to close the top opening required in the manufacturing process.

Hydraulic fluid flows downwardly through the channel 72 in the direction of the arrow 80 and enters the sealed spool valve 82 through the aligned inlet opening 84. The combination spool valve and pivot shaft 82 serves as a pivot shaft about which the handle assembly 22 is rotated arcuately to activate the piston 30. The handle assembly 22 and pivot shaft 82 are pinned at 133 (FIG. 6). The combination valve and shaft 82 also serves as a hydraulic fluid passageway as hereinafter more fully set forth. A plurality of peripheral seals 86 are provided in longitudinally spaced relationship along the spool valve 82 within peripheral grooves 85 to prevent hydraulic fluid leakage between the spool valve 82 and the pump housing and lift housing assemblies. The seals 86 also act to retain the hydraulic fluid within respective channels provided within the spool valve and to prevent leakage between channels, for example, between the respective hydraulic fluid carrying channels 128, 124, 89 and 84.

As illustrated in FIGS. 5 and 6, hydraulic fluid flows from the vertical channel 72 in the pump housing assembly 28 through the inlet 84 in the spool valve 82. The inlet channel 84 communicates with the horizontal channel 88 wherein the fluid flows in the direction of the arrow 92, through the channel 89 to the outlet opening 90. The channel 88 is outwardly sealed by a conventional pressure plug 91 which may be threaded. The channel 89 which communicates with the outlet opening 90 is suitably exteriorly sealed by a steel ball 94 which serves to close the opening required in the manufacture of the channel. It will be noted that the steel balls 78, 94 and the plugs 76, 91 are utilized to close openings necessitated by machining operations only and do not form part of the operating mechanism after assembly. It will be noted that the pair of seals 86a suitably seal the channel 128, the pair of seals 86b seal the channel 124, the seals 86c seal the channel 89 and the pair of seals 86d serve to seal the channel 84. As hereinafter more fully set forth, it will be noted that high pressure hydraulic fluid (not shown) has bi-directional flow through the communicating channels 84, 88, 89 as illustrated by the arrows 92, 93. Low pressure hydraulic fluid upon full lift has uni-directional flow through the communicating channels 124, 126, 128 as indicated by the arrow 127.

Referring now to FIGS. 5 and 7, it will be observed that hydraulic fluid flowing through the outlet opening 90 flows in the direction of the arrow 96 through the channel 98 which is formed in the lift ram assembly 26. After machining, the horizontal channel 98 is endwardly closed by the steel ball 100. Oil flowing through the channel 98 under pressure from the pump piston 30 flows downwardly through the vertical groove or channel 102 which is formed in the periphery of the lift ram housing 104 in the direction of the arrow 106. The high pressure ram seal 108 seals the groove 102 to prevent upward passage of hydraulic fluid passage thereabout. The high pressure hydraulic fluid exits the groove 102 below the bottom 110 of the lift ram 112 and through the openings 116 in a manner to force the lift ram 112 upwardly within the channel defined by the lift ram housing 104. The high pressure hydraulic fluid also enters the bottom positioned cavity 114 to thereby force the lift ram 112 upwardly within the lift ram housing 104. It will be noted that one or more radially extending bleed holes 116 communicate between the bottom cavity 114 and the outer periphery of the lift ram 112.

Repeated arcuate reciprocation of the handle assembly 22 about the lift assembly 26 causes the piston 30 to urge additional amounts of hydraulic fluid through the various interconnecting ports and channels in the direction of the arrows 68, 80, 92, 96 and 106 to raise the lift ram 112 in increments within the lift ram housing 104 thereby raising the lift truck frame 12 and the forks 14 for load carrying and transmitting purposes.

The upward travel of the lift ram 112 within the lift ram housing 104 is limited by the height of the by-pass port or channel 118 which is formed in the lift ram assembly 26 above the high pressure ram seal 108 and below the low pressure ram seal 120. Thus, as the lift ram 112 is elevated by repeated reciprocation of the piston 30, the bleed holes 116 will be elevated into the area defined between high pressure seal 108 and the low pressure seal 120 to permit flow through the by-pass port 118. When the lift ram is so elevated to communicate the bleed holes 116 with the by-pass port 118, the hydraulic fluid (not shown) will be released from within the cavity 114 and under ram 112 and will flow in the direction of the arrow 122 through the by-pass port 118 to enter the spool valve 82 through the peripheral outlet or channel 124 (FIGS. 5 and 6).

The released hydraulic fluid flows from the spool valve inlet opening 124 through the concentric, horizontal channel 126 in the direction of the arrow 127 and exits the spool valve 82 through the outlet channel 128. It will be noted that the hydraulic fluid flowing through the bleed holes 116, the by-pass port 118, and pivot shaft channels 124, 126, 128 is low pressure fluid which is separated and isolated from the high pressure system by the high pressure seal 108. The spool valve outlet opening or channel 128 communicates with the vertical channel 130 which is formed in the body 64 of the pump housing assembly 28 and then flows upwardly through the channel 130 in the direction of the arrow 132. A one-way ball check valve 136 controls fluid flow through the horizontal channel 150 and thence through the outlet opening 152 back into the reservoir 154 as indicated by the arrow 146. The pivot shaft channel 126 is suitably sealed after machining by the threaded plug 134 or by a ball (not shown); the housing vertical channel 130 is suitably sealed by the steel ball 158 and the horizontal channel 150 is conventionally sealed by the threaded plug 156 to thereby provide a tightly sealed hydraulic circuit in the manner illustrated. A roll pin 142 or other construction is inserted within the channel 150 to maintain the steel ball 136 in association with its seat.

Figure 9:
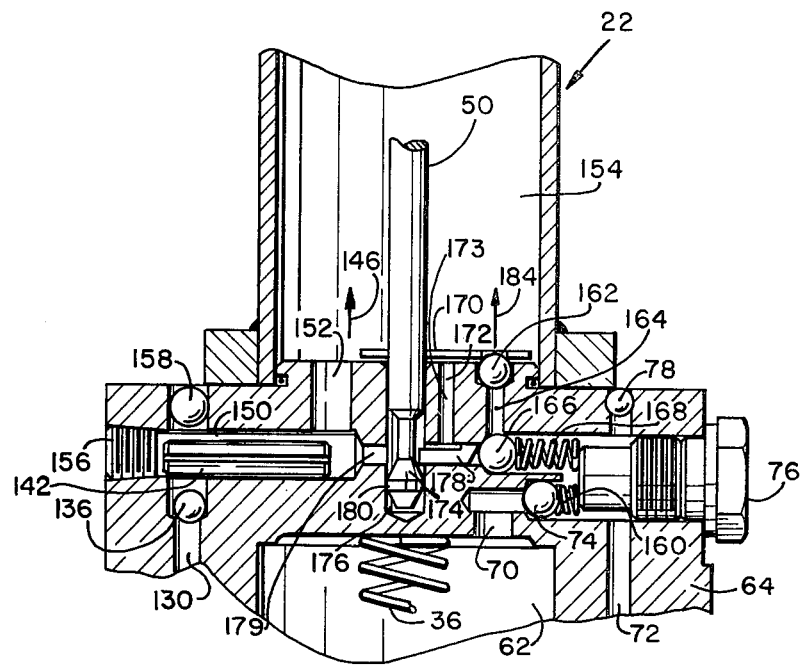
FIG. 9 is an enlarged, partial, detailed sectional view showing the position of parts with the release rod in the release valve closed position.
Figure 10:
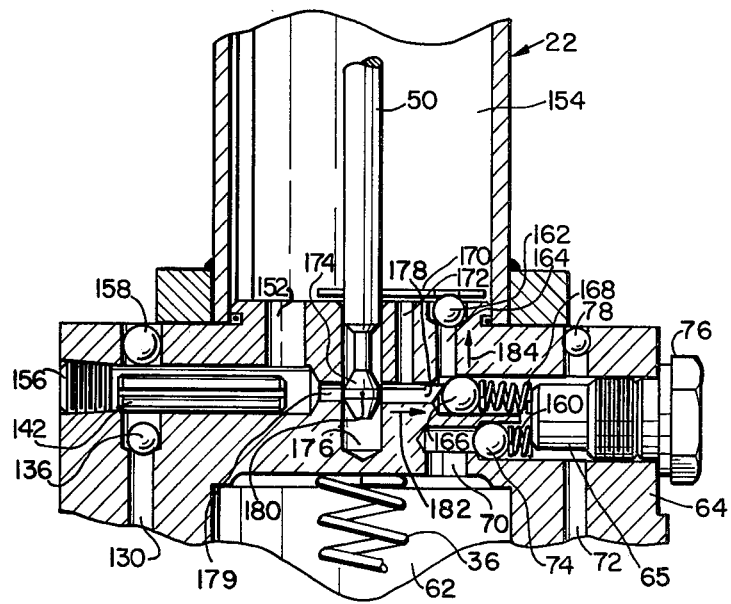
FIG. 10 is a view similar to FIG. 9 showing the position of parts with the release rod in the release valve open position.

Referring to FIGS. 9 and 10, the function and operation of the operating lever 52 and release rod 50 will now be described. Referring initially to FIG. 9, the release rod 50 is illustrated in its lowermost position as urged by the spring 56 (FIG. 5). The cam surface 174 of the release rod 50 is shown positioned within the recess 176 which is below the horizontal position of the release pin 178. As the operating lever 52 is pulled, the conical cam surface 174 is upwardly moved to increasingly depress the spring 168 and to increasingly unseat ball 166, thereby to accelerate the release of hydraulic fluid back to the reservoir 154. The cam 174 is generally ellipsiod in configuration and includes a pin contacting, widened medial area 180 and upper and lower frusto-conical surfaces which taper from the widened section to facilitate ease in assembly and activation of the release pin 178. With the parts positioned as illustrated in FIG. 9, it is noted that the widened medial area 180 of the cam 174 is positioned below the release pin 178. In such a position, the spring 168 biases against the inward surface of the threaded plug 76 to urge the one-way ball valve 166 into a position to close the horizontal channel 179. The ball valve 166, when seated, acts to prevent high pressure hydraulic fluid from reaching the channel 179. A one-way ball valve 162 closes the upper end of the channel 164 to retain hydraulic fluid within the ports 72 and 65. An overload spring 170 is positioned against the ball 162 to serve as a detent and to permit release of the ball 162 sufficiently to permit fluid flow upwardly through the channel 164 into the reservoir 154 in the event of overload.

A spring or retainer 173 is operable within the port 172 to hold or retain the valve pin 178 in position in the event that the rod 50 were removed, as with handle disassembly. The retainer 173 is provided to prevent the pin 178 from moving into the port 176 under impetus of the spring 168 during maintenance on the handle or other similar operations. Such movement of the valve pin 178 would thereby prevent the rod cam from reentering the recess 176 when attempting to reassemble the parts.

With the parts positioned as in FIG. 9, upon activation of the piston 30, high pressure hydraulic fluid from within the pump chamber 62 exits through the port 70 and urges the one-way valve ball 74 off its seat against the bias of its associated spring 160 to allow fluid to flow downwardly through the vertical channel 72 in the direction indicated by the arrow 80 in FIG. 5. As above set forth, hydraulic fluid which escapes through the bleed openings 116 in the lift ram 112 flows through the by-pass port 118, through the pivot shaft 82 and upwardly through the vertical channel 130 in the direction of the arrow 132. The hydraulic fluid unseats the one way ball valve 136 to again enter the hydraulic fluid reservoir 154 through the channel 150 and outlet opening 152 as indicated by the arrow 146. Accordingly, all hydraulic fluid which is forced through the system by the piston 30 normally follows the path above described and upon reaching the upper limit of travel within the lift ram housing 104, the lift ram 112 will normally remain in its uppermost position with the bleed holes 116 in communication with the by-pass port 118 or above the high pressure seal 108.

When it is desired to lower the load which is lifted upon the forks 14, the operator (not shown) pulls upwardly on the operating lever 52 (FIG. 1) to upwardly urge the attached release rod 50. As illustrated in FIG. 10, upward movement of the release rod 50 engages cam surface 174 with the release pin 178. The cam surface 174 urges the release pin 178 horizontally outwardly in the direction of the arrow 182 to thereby unseat the one way ball valve 166 by depressing the spring 168. Unseating of the ball valve 166 exposes the horizontal channel 179 to thereby allow high pressure hydraulic fluid (not illustrated) to travel horizontally within the channel 179 in the direction of the arrow 92a which is illustrated dotted (FIG. 11) to indicate fluid release to exit channels 152 and 172 to reservoir 154. The cam surface 174 acts to predetermine the lowering rate of infinite positions of cam surface in contact with pin 178. As the release rod 50 is upwardly pulled from the low position as shown in FIG. 9 to the upper position as illustrated in FIG. 10, it will be observed that conical cam surface 174 will act to push the ball 166 in infinitely increasing distances from its seat by urging the pin 178 laterally in the direction of the arrow 182. As the distance between the ball 166 and its seat increases in response to increasingly upward pull on the operating lever 52, greater quantities of hydraulic fluid can exit through the channels 179, 152 and 172 to the reservoir 154 to thereby speed the rate of load lowering. Infinite incremental movements of the operating lever 52 and the connected release rod 50 will produce corresponding infinite rate lowering of the load by controlling the flow of high pressure hydraulic fluid through the one way ball valve 166.

It will be noted the excessive high pressure generated within the hydraulic system will be sufficient to overcome the bias of the overload spring 170 to thereby allow fluid to flow in the direction of the arrow 184. Release of the excessive pressure fluid at the valve 162 permits the lift arm 112 to travel downwardly within the lift ram housing 104 to thereby lower the forks 14 to the lowermost position, or not allow excessive loads to be lifted. Release of the operating lever 52 permits the spring 56 to again bias the release rod 50 to its lowermost position as illustrated in FIG. 9 to again close the ball valve 166. In this position, reciprocation of the pump piston will again act to raise the lift ram 112.

Figure 11:
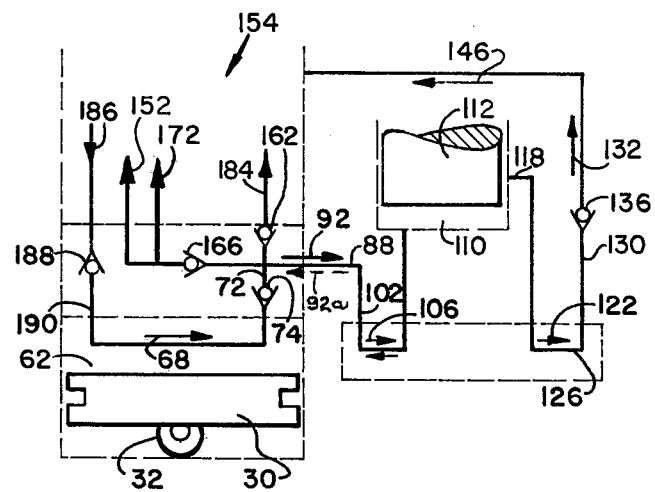
FIG. 11 is a schematic view of the hydraulic circuitry of the invention.

Referring now to FIG. 11, the schematic hydraulic circuit will be described in conjunction with the operating parts hereinbefore set forth. Upon reciprocation of the piston 30 within the chamber 62 as controlled by the rolling of the roller 32 upon the cam plate 38, the suction stroke will draw hydraulic fluid in the direction of the arrow 186 through the one-way inlet valve 188 through the inlet channel 190. (See also FIG. 7). The power stroke of the piston 30 causes hydraulic fluid flow in the direction of the arrow 68 (FIG. 5) through the outlet port 70 (FIG. 10) and past the one way valve 74 into the vertical channel 72 as indicated. Upon lifting of the one way valve 74, the hydraulic fluid flows through the channels 72, 88 in the direction of the arrow 92 through the pivot shaft outlet opening 89 into the channels 90, 98. The fluid then flows under pressure downwardly through the vertical groove 102 in the lift ram housing and to the bottom 110 of the lift ram 112 in the direction indicated by the arrow 106.

Upon elevation of the lift ram 112 to align the bleed holes 116, with the by-pass port 118, (FIG. 4), the hydraulic fluid will exit through the by-pass port 118 in the direction of the arrow 122 to enter the spool valve 82 (FIG. 4) through the aligned channel 124 (FIG. 5) and into the horizontal, concentric channel 126. The hydraulic fluid thence flows back to the reservoir 154 in the direction indicated by the arrow 146.

Still referring to FIG. 11, upon activation of the release rod 50, the cam surface 174 pushes the release pin 178 to unseat the one way valve 166, thereby allowing the hydraulic fluid to flow directly back to the reservoir 154 through the channels 152 and 172, in the direction indicated by the arrow 146 (FIG. 9). In the event of overload, the hydraulic fluid will exit in the direction of the arrow 184 to unseat the overload ball valve 162 against the bias of the overload spring 170.

As may be seen in FIG. 5, wheel axle 17 has limited vertical movement or rotation within the single plane flared opening 19 whereby the articulated axle 17 allows both steer wheels 16 to contact the supporting surface, despite ruts, uneven floors or obstacles on the ground. Trucks without such steer wheel articulation would tend to force the steer handle from the operator's hands as one of the wheels encounters floor ruts or obstacles. The opening 19 is flared endwardly only in the vertical plane to allow vertical axle articulation without affecting steering. If the opening 19 was merely flared instead of being only vertically flared, lost motion would be inherent in steering right or left.

Although the invention has been described with reference to the particular embodiments herein set forth, it is understood that the present disclosure has been made only by way of example and that numerous changes in the details of construction may be resorted to without departing from the spirit and scope of the invention. Thus, the scope of the invention sould not be limited to the foregoing specification but rather only by the scope of the claims appended hereto.

What is claimed is:

1. In a hydraulic lift truck of the type including a frame mounted upon wheels, a handle and a hydraulic system capable of elevating a ram within a lift ram assembly to lift a portion of the frame for load transport purposes, the improvements comprising
   a hydraulic fluid reservoir movable with the handle and forming a part of the hydraulic system;
   a pump housing assembly below the reservoir, the pump housing assembly comprising a pump adapted to receive hydraulic fluid from the reservoir and to discharge the hydraulic fluid in measured quantities at high pressure to a high pressure part of the hydraulic system,
   said pump including a chamber, a piston reciprocal within the chamber and a follower, the said follower being adapted to be rotated relative to the piston;
   shaped cam means carried in stationary relationship by the lift ram assembly and adapted to be contacted by the follower to reciprocate piston,
   said follower being in moving contact with the cam means when the handle is arcuately reciprocated relative to the cam means to reciprocate the piston,
   whereby the high pressure hydraulic fluid effluent from the pump elevates the lift ram in incremental steps as the handle is arcuately rotated; and
   a release means to release high pressure hydraulic fluid into the reservoir to lower the elevated lift ram.

2. The hydraulic lift truck according to claim 1 wherein at least a portion of the release means is positioned within the reservoir and is movable through the reservoir.

3. The hydraulic lift truck of claim 1 and a resilient member adapted to continuously bias the piston and the follower towards the cam means.

4. The hydraulic lift truck of claim 1 wherein the pump housing assembly comprises a first high pressure channel, said first high pressure channel being in fluid communication with the pump chamber.

5. The hydraulic lift truck of claim 4 and a high pressure one way valve interposed between the first high pressure channel and the reservoir, said high pressure valve being movable by the release means from a normally closed position wherein high pressure fluid is prevented from entering the reservoir and an open position wherein high pressure fluid can enter the reservoir to lower the elevated lift ram.

6. The hydraulic lift truck of claim 5 wherein the high pressure one way valve comprises a seat, a ball residable on the seat to close the valve and resilient means to urge the ball toward the seat, and a release pin means movable within the pump housing assembly, said release pin means being adapted to move the ball from the seat to permit passage of high pressure hydraulic fluid to the reservoir, the release pin means being in contact with the release means and being moved thereby.

7. The hydraulic lift truck of claim 6 wherein the release means is operable through the pump housing assembly to variably open the high pressure valve, the release pin means contacting the ball to variably move the ball from its seat.

8. The hydraulic lift truck of claim 7 wherein the release means comprises an extended release rod, said release rod having an extremity thereof adapted to reciprocate within the pump housing assembly.

9. The hydraulic lift truck of claim 8 wherein portions of the release rod extremity are of non-uniform dimensions, which portions are adapted to provide infinite rate lowering control by varying in infinite increments the movement of the ball relative to its seat.

10. The hydraulic lift truck of claim 9 wherein the portions are of non-uniform diameter.

11. The hydraulic lift truck of claim 9 wherein the portions of the release rod extremity include an area of narrow diameter, said release pin approaching the narrow diameter area when the ball is urged against the said seat to the normally closed position.

12. The hydraulic lift truck of claim 9 wherein the portions of the release rod extremity include means to vary the rate of lowering.

13. The hydraulic lift truck of claim 12 wherein the means to vary include areas of increasingly wide diameter, said areas being brought into alignment with the release pin when the release rod is reciprocally moved, said increasing wide diameter areas pushing the release pin toward the ball against the bias of the resilient means to move the ball off its seat, whereby the high pressure valve is opened and the high pressure hydraulic fluid is returned to the reservoir to lower the lift ram at a variable rate of speed.

14. The hydraulic lift truck of claim 9 wherein the said portions of the release rod extremity are formed to a cam surface, said cam surface having portions of varying inclination, whereby the lowering rate can be varied infinitely.

15. The hydraulic lift truck of claim 1 wherein the lift ram assembly comprises a housing within which housing the ram is longitudinally reciprocal, the housing being provided with a longitudinal groove to direct high pressure fluid through the housing to the bottom of the ram.

16. The hydraulic lift truck of claim 15 wherein the bottom of the ram comprises a cavity and wherein the high pressure hydraulic fluid is directed by the groove into the cavity.

17. The hydraulic lift truck of claim 16 and bleed holes communicating with the cavity, said bleed holes extending from the cavity to the outer periphery of the lift ram.

18. The hydraulic lift truck of claim 17 and a bypass port forming a fourth part of the hydraulic system, said bypass port being formed in the tip of the lift ram assembly above the top of the groove whereby high pressure hydraulic fluid can flow through the bleed holes into the bypass port when the lift ram is sufficiently elevated to align the bleed holes and bypass port to thereby limit the upward travel at the lift ram.

19. The hydraulic lift truck of claim 4 and a pivot shaft positioned within the left ram housing, said handle being adapted to arcuately reciprocate in an arc about the pivot shaft axis to roll the follower over the cam means for piston reciprocation purposes.

20. The hydraulic lift truck of claim 19 wherein the pivot shaft is provided with a second high pressure channel, said second high pressure channel communicating with the said first high pressure channel to transfer high pressure hydraulic fluid to the lift ram assembly.

21. The hydraulic lift truck of claim 18 and a pivot shaft positioned within the lift ram housing, the pivot shaft being provided with a low pressure channel forming a part of the hydraulic system, said low pressure channel communicating with the bypass port and the reservoir to transfer low pressure hydraulic fluid from the lift ram housing back to the reservoir.

22. The hydraulic lift truck of claim 1 and an overload channel intercommunicating between the reservoir and the high pressure part of the hydraulic system.

23. The hydraulic lift truck of claim 22 and an overload valve interposed between the overload channel and the reservoir, the said overload valve being adapted to prevent passage of hydraulic fluid below a predetermined high pressure from passing from the overload channel to the reservoir and to permit hydraulic fluid at pressure above said predetermined high pressure to flow into said reservoir from the overload channel.

24. The hydraulic lift truck of claim 23 wherein said overload valve comprises a seat, a ball movable into sealing engagement on said seat and a leaf type spring adapted to bias the ball toward the seat.

25. The hydraulic lift truck of claim 19 wherein the pivot shaft is secured to the pump housing assembly and whereby the pivot shaft, the handle and the pump rotate relative to the lift ram housing.

26. The hydraulic lift truck of claim 9 wherein the said portions are adapted to provide the said infinite rate lowering control regardless of the arcuate position of the handle as it is arcuately reciprocated.

27. The hydraulic lift truck of claim 9 wherein the pump is adapted to be rotated relative to the lift ram assembly and wherein the said portions are adapted to provide the said infinite rate lowering control regardless of the rotated position of the pump as it is rotated.

28. The hydraulic lift truck of claim 1 and valve means interposed between the reservoir and the pump, said valve means being adapted to permit the handle to be disconnected from the pump without losing hydraulic fluid from the reservoir.

29. The hydraulic lift truck of claim 1 and separable means interposed between the pump housing assembly and the lift ram assembly, the separable means being adapted to permit removal of the pump housing assembly from association with the lift ram assembly.

30. The hydraulic lift truck of claim 22 wherein the ram is unitary.

31. The hydraulic lift truck of claim 1 wherein the wheels are rotatively carried by an axle and the said axle being retained within an opening positioned near the bottom of the lift ram assembly.

32. The hydraulic lift truck of claim 31 wherein the opening comprises means to articulate the axle in a vertical plane only.

33. The hydraulic lift truck of claim 32 wherein the means to articulate comprises the opening being endwardly tapered only in the vertical plane.

34. The hydraulic lift truck of claim 1 wherein the hydraulic fluid reservoir is within the handle.

35. The hydraulic lift truck of claim 3 wherein the resilient member is interposed between the piston and a part of the pump housing assembly.

36. The hydraulic lift truck of claim 6 wherein the release pin means comprises a pin, the pin being in contact with the ball and with a portion of the said release means.

37. The hydraulic lift truck of claim 26 wherein the lowering rate is directly proportional to distance of movement of the release rod.

38. The hydraulic lift truck of claim 9 wherein the pump is adapted to be rotated relative to the lift ram assembly and wherein the said portions are adapted to provide the said infinite rate lowering control through a steering range of approximately two hundred and twenty degrees.

39. In a hydraulic lift truck of the type including a frame mounted upon wheels, a handle arcuately reciprocal relative to the frame and a hydraulic system capable of elevating a lift ram to lift a portion of the frame for load transport purposes, the improvement comprising a hydraulic fluid reservoir carried above the frame;
a pump housing assembly connected to the handle and comprising a pump means to receive hydraulic fluid from the reservoir and to discharge the hydraulic fluid in measured quantities at high pressure to a high pressure channel,
said pump means comprising a piston and a follower;
a lift ram assembly receiving high pressure hydraulic fluid from the pump means and comprising the lift ram and a shaped cam means, the shaped cam means being adapted to be contacted by the follower to reciprocate the piston when the handle is arcuately reciprocated;
a pivot shaft assembly pivotally interconnecting the pump housing assembly and the lift ram assembly; and
hydraulic fluid release means to release high pressure hydraulic fluid from the high pressure channel to infinitely incrementally lower the lift ram,
the hydraulic fluid release means comprising a release rod movable in infinite increments and a high pressure one way valve interposed between the reservoir and the high pressure channel, the one way valve including an opening, a movable solid member adapted to seat upon and close the opening and a resilient member positioned to continuously bias the solid member toward the opening,
the hydraulic fluid release means further comprising a contact member adapted to be movable upon movement of the release rod, the contact member contacting and moving the solid member against the bias of the resilient member, the contact member being adapted to move the solid member away from the seat in corresponding infinite increments as the release rod is moved;
whereby the high pressure hydraulic fluid effluent from the pump elevates the lift ram in incremental steps as the handle and the pump housing assembly are arcuately reciprocated about the pivot shaft assembly and whereby the lift ram is lowered at infinite rates as the high pressure hydraulic fluid is released at corresponding infinite rates.

40. The hydraulic lift truck of claim 39 wherein the pivot shaft assembly is provided with a first hydraulic fluid passageway, the first hydraulic fluid passageway conducting high pressure hydraulic fluid from the high pressure channel to the lift ram assembly.

41. The hydraulic lift truck of claim 39 wherein the lift ram assembly comprises means to release hydraulic fluid at low pressure, the means to release comprising a hydraulic fluid bleed hole in the bottom of the lift ram and a by-pass channel in the lift ram assembly, the bleed hole being lifted by high pressure hydraulic fluid into communication with by-pass channel when the lift ram reaches an upper limit of travel to release the high pressure hydraulic fluid at low pressure.

42. The hydraulic lift truck of claim 41 wherein the pivot shaft assembly is provided with a second hydraulic fluid passageway, the second hydraulic fluid passageway conducting low pressure hydraulic fluid released from the lift ram assembly to the pump housing assembly.

43. The hydraulic lift truck of claim 33 wherein the pump housing assembly and the reservoir are arcuately movable with the handle and wherein the hydraulic fluid release means is adapted to release high pressure hydraulic fluid at all arcuately reciprocated positions of the handle.

44. In a hydraulic lift truck of the type including a frame mounted upon wheels, a handle arcuately reciprocal relative to the frame and a hydraulic system capable of elevating a lift ram to lift a portion of the frame for load transport purposes, the improvement comprising a hydraulic fluid reservoir movable with the handle;
a pump housing assembly connected to the handle and comprising a pump, the pump being adapted to directly receive hydraulic fluid from the reservoir and to discharge the hydraulic fluid in measured quantities at high pressure to high pressure channel,
said pump including a hydraulic fluid chamber, a piston reciprocal within the chamber and a follower, the said follower adapted to reciprocate the piston;
a lift ram assembly receiving high pressure hydraulic fluid from the high pressure channel and comprising the lift ram and a shaped cam means, the shaped cam means being stationary in the lift ram assembly and being adapted to be contacted by the follower to reciprocate the piston when the handle is arcuately reciprocated;
a pivot shaft assembly pivotally interconnecting the pump housing assembly and the lift ram assembly to permit the pump housing assembly to move relative to the lift ram assembly when the handle is arcuately reciprocated,
the pivot shaft assembly comprising a first fluid conduit interconnecting the high pressure channel in the pump housing assembly with the lift ram assembly; and hydraulic fluid release means to release high pressure hydraulic fluid from the pump housing assembly to lower the lift ram,
  the hydraulic fluid release means comprising a release rod,
  a one way valve interposed between the high pressure channel and the reservoir, and contact means between the release rod and the one way valve to open the one way valve in response to movement of the release rod;
whereby the high pressure hydraulic fluid effluent from the pump elevates the lift ram in incremental steps as the handle and the pump housing assembly are arcuately reciprocated about the pivot shaft assembly axis and whereby the lift ram can be lowered incrementally as the high pressure hydraulic fluid is released.

45. The hydraulic lift truck of claim 44 wherein the hydraulic fluid release means comprises means to vary the rate at which hydraulic fluid is released from the lift ram assembly.

46. The hydraulic lift truck of claim 44 wherein the lift ram is provided with a bleed hole and wherein the lift ram assembly is provided with a low pressure by-pass channel, the by-pass channel being positioned to be in fluid communication with the bleed hole when the lift ram reaches the upper limit of its travel, the high pressure hydraulic fluid flowing through the by-pass channel when the bleed hole and by-pass channel are in communication to prevent further elevation of the lift ram.

47. The hydraulic lift truck of claim 46 wherein the pivot shaft assembly comprises a second hydraulic fluid passageway, the second hydraulic fluid passageway conducting low pressure hydraulic fluid from the by-pass channel to the pump housing assembly.

48. The hydraulic lift truck of claim 44 wherein the hydraulic fluid release means is adapted to release high pressure hydraulic fluid at all arcuately reciprocated positions of the handle.

49. The hydraulic lift truck of claim 41 wherein the pivot shaft assembly is provided with a second hydraulic fluid passageway, the second hydraulic fluid passageway conducting low pressure hydraulic fluid released from the lift ram assembly to the pump housing assembly.

* * * * *